US006588714B2

(12) United States Patent
Blane et al.

(10) Patent No.: US 6,588,714 B2
(45) Date of Patent: Jul. 8, 2003

(54) CABLE PROTECTOR AND SUPPORT

(75) Inventors: David Blane, Inverurie (GB); Iain Baxter, Cove Bay (GB)

(73) Assignee: Camco International (UK) LTD (GB)

( * ) Notice: Subject to any disclaimer, the term of this patent is extended or adjusted under 35 U.S.C. 154(b) by 0 days.

(21) Appl. No.: 09/790,578

(22) Filed: Feb. 23, 2001

(65) Prior Publication Data
US 2002/0030144 A1 Mar. 14, 2002

Related U.S. Application Data

(63) Continuation of application No. PCT/GB00/02597, filed on Jul. 6, 2000.

(51) Int. Cl.$^7$ .................................................. F16L 3/22
(52) U.S. Cl. ...................... 248/68.1; 248/74.4; 248/67.5
(58) Field of Search ........................... 248/61, 69, 74.1, 248/74.4, 67.5, 68.1, 58

(56) References Cited

U.S. PATENT DOCUMENTS

| | | | | |
|---|---|---|---|---|
| 2,303,108 A | * | 11/1942 | Blackburn | 248/74.1 |
| 2,550,001 A | * | 4/1951 | Button | 248/74.1 |
| 4,020,531 A | * | 5/1977 | Ahrens et al. | 248/74.1 X |
| 4,909,462 A | * | 3/1990 | Usui | 248/74.1 |
| 4,973,259 A | * | 11/1990 | Sachs | 248/61 X |
| 5,979,839 A | * | 11/1999 | Horn et al. | 248/71 |
| 6,135,398 A | * | 10/2000 | Quesnel | 248/74.1 |

FOREIGN PATENT DOCUMENTS

| | | | |
|---|---|---|---|
| GB | 2 138 056 | | 10/1984 |
| GB | 2149000 | * | 6/1985 |
| GB | 2 201 177 | | 8/1988 |
| WO | WO93/20327 | | 10/1993 |

* cited by examiner

*Primary Examiner*—Korie Chan
(74) *Attorney, Agent, or Firm*—Nixon & Vanderhye PC

(57) ABSTRACT

A safety valve incorporated in a tubing string has a diameter considerably larger than that of the rest of the tubing string. A cable protector is fastened onto the tubing string at the lead in to the safety valve to ensure that cables extending along the outside of the tubing string are able to cope with the changes in diameter without strain or damage. The cable protector is formed from two cast bodies and hingedly connected together to define a substantially circular inner cross-section. The upper body member is provided with an elongate cable slot in which the cable is received. In addition, the upper body member is shaped to give the cable protector an increasing internal cross-sectional size, or transverse dimension, along its length from one end to the other and, whereby the distance of the cable from the longitudinal axis of the tubing string increases as it extends therealong. Thus the cable received within the cable slot is guided along a path which has a varying spacing from the longitudinal axis.

17 Claims, 3 Drawing Sheets

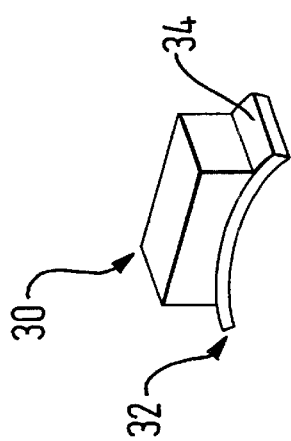
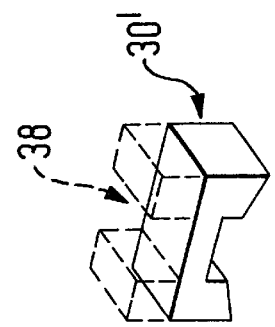
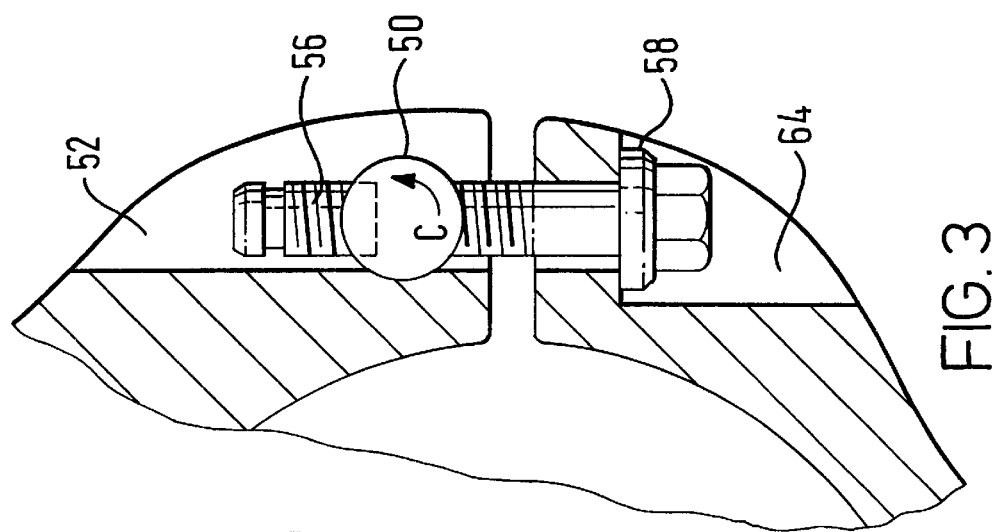
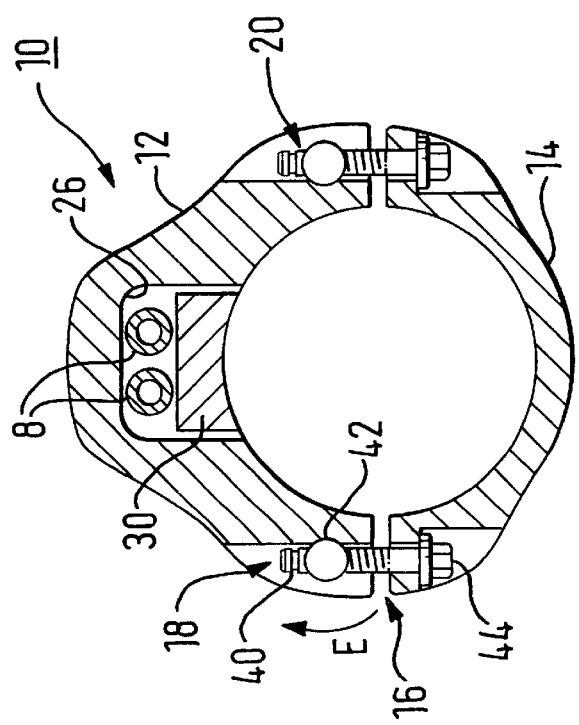

CABLE PROTECTOR AND SUPPORT

This us a continuation of application No. PCT/GB00/02597 filed Jul. 16, 2000.

The present invention relates to cable protectors for tubulars.

It is known to protect or support cables as they pass along the outside of tubing strings and other tubulars in a downhole well. For example, generally cylindrical cable protectors have been applied across couplings in a tubing string and have been provided with cable slots to receive, and thereby protect, cables.

The invention seeks to extend this concept and to provide protection for cables at other locations.

According to a first aspect of the present invention there is provided a cable protector for tubulars, the cable protector comprising an elongate protector body having a substantially circular internal cross-section, the protector body being formed by two or more body members hingedly connected to enable the protector body to encircle a tubular, the protector body further comprising fastening means for fastening body members together to hold the protector body around the tubular, and the protector body further comprising a cable slot extending longitudinally of the protector body along an inner surface thereof, and wherein the internal transverse dimension of the protector body varies along the length thereof whereby cables received within the cable slot are constrained to follow a path along the cable protector which has a varying spacing from the longitudinal axis of the cable protector.

In an embodiment, the internal transverse dimension of the protector body is less at one end thereof than at the other end thereof.

A subsea safety valve, for example, has an outside diameter which is considerably larger than that of the tubing string in which the safety valve is incorporated. This provides a varying diameter along the length of the tubular, and a cable protector of the invention may be used to guide and protect cables which span the safety valve.

In this respect, the term "cable" is used herein to refer to any cable, wire, or similar elongate item which extends along the outside of a tubular.

In an embodiment, one or more cable retention members are received within the cable slot to retain cables therein.

The provision of cable retention members ensures that the cable or cables are fully captivated within the cable protector. This increases the protection and support for the cables and ensures that the cable or cables cannot be inadvertently removed.

The present invention also extends to a cable protector for tubulars, the cable protector comprising an elongate protector body having a substantially circular internal cross-section, the protector body being formed by two or more body members hingedly connected to enable the protector body to encircle a tubular, the protector body further comprising fastening means for fastening body members together to hold the protector body around the tubular, and the protector body further comprising a cable slot extending longitudinally of the protector body along an inner surface thereof, and wherein one or more cable retention members are receivable within said cable slot to retain cables therein.

In an embodiment, the internal transverse dimension of the protector body varies along the length thereof whereby cables received within the cable slot are constrained to follow a path along the cable protector which has a varying spacing from the longitudinal axis of the cable protector.

For example, the internal transverse dimension of the protector body may be less at one end thereof than at the other end whereby cables retained within the cable slot span an area along a tubular with a varying diameter.

In one embodiment, the elongate protector body of the cable protector is formed by two cooperating body members hingedly connected along an elongate hinge line.

The hinge may be formed by any appropriate means. In a preferred embodiment, two or more individual hinge pins are spaced along the hinge line to connect the two body members together.

BACKGROUND OF THE INVENTION

The body members may be made of any appropriate materials and may be shaped appropriately. In one embodiment, each of the two body members is cast from metal, and may be substantially solid, or may be cast to have areas omitted to save material and weight. In this latter case, the resulting protector body may, although formed from only two body members, be configured to present two annular collars interconnected by elongate blades.

SUMMARY OF THE INVENTION

In an alternative construction, the cable protector is formed from three cooperating body members. The first body member is a base member which is substantially semicircular in configuration, and at each of its ends second body members in the form of collars are hingedly connected thereto whereby the resultant cable protector has two annular collars interconnected by the semicircular base body member.

The base member may be substantially solid, and, for example, cast from metal. Alternatively, the base member may be configured to have spaced end collars interconnected by elongate blades.

There are various configurations of cable protectors in use, and any of these known configurations may be adapted for use in an embodiment of the present invention.

Where two collars are hingedly connected to a base member, each collar is preferably hingedly connected to the base member to define an elongate hinge line. For example, each collar is hinged to the base member by way of a respective hinge pin.

Fastening means are provided for fastening the body members together. For example, two body members may be held together by two spaced fastening members. Where the construction utilises spaced collars, each collar may be fastened to the base member by a respective fastening means.

It is preferred that the fastening means be configured such that they do not protrude relative to the external surface of the cable protector.

In a preferred embodiment, each fastening means comprises a fastening member appropriately mounted in the material of a body member or collar and pivotable relative to that body member or collar to enable fastening thereof. The use of a pivotable fastening member is particularly preferred as pivoting movement can be prevented if the fastening member is in an incorrect position. This means that if a fastening member is moved by vibration or other downhole conditions, inadvertent unfastening is prevented.

In a preferred embodiment, each fastening member is an elongate bolt pivotally mounted with respect to a body member of the cable protector. A nut or other fastening means is threaded onto the bolt and is arranged to engage a further body member whereby the two body members are fastened together.

In a preferred embodiment, the bolt of each fastening member extends through a tubular barrel which provides the pivoting movement of the fastening member.

BRIEF DESCRIPTION OF THE DRAWINGS

Embodiments of the present invention will hereinafter be described, by way of example, with reference to the accompanying drawings, in which:

FIG. 2 is a cross-section of the cable protector taken along line A—A of FIG. 2, but with the tubing string omitted;

FIG. 3 is an enlarged detail of the cable protector of FIG. 2 showing fastening means thereof;

FIG. 4 shows a cable retainer of the cable protector of FIG. 2;

FIG. 5 shows an alternative cable retainer for the cable prtector of FIG. 2.

DETAILED DESCRIPTION OF THE INVENTION

Figure 1:
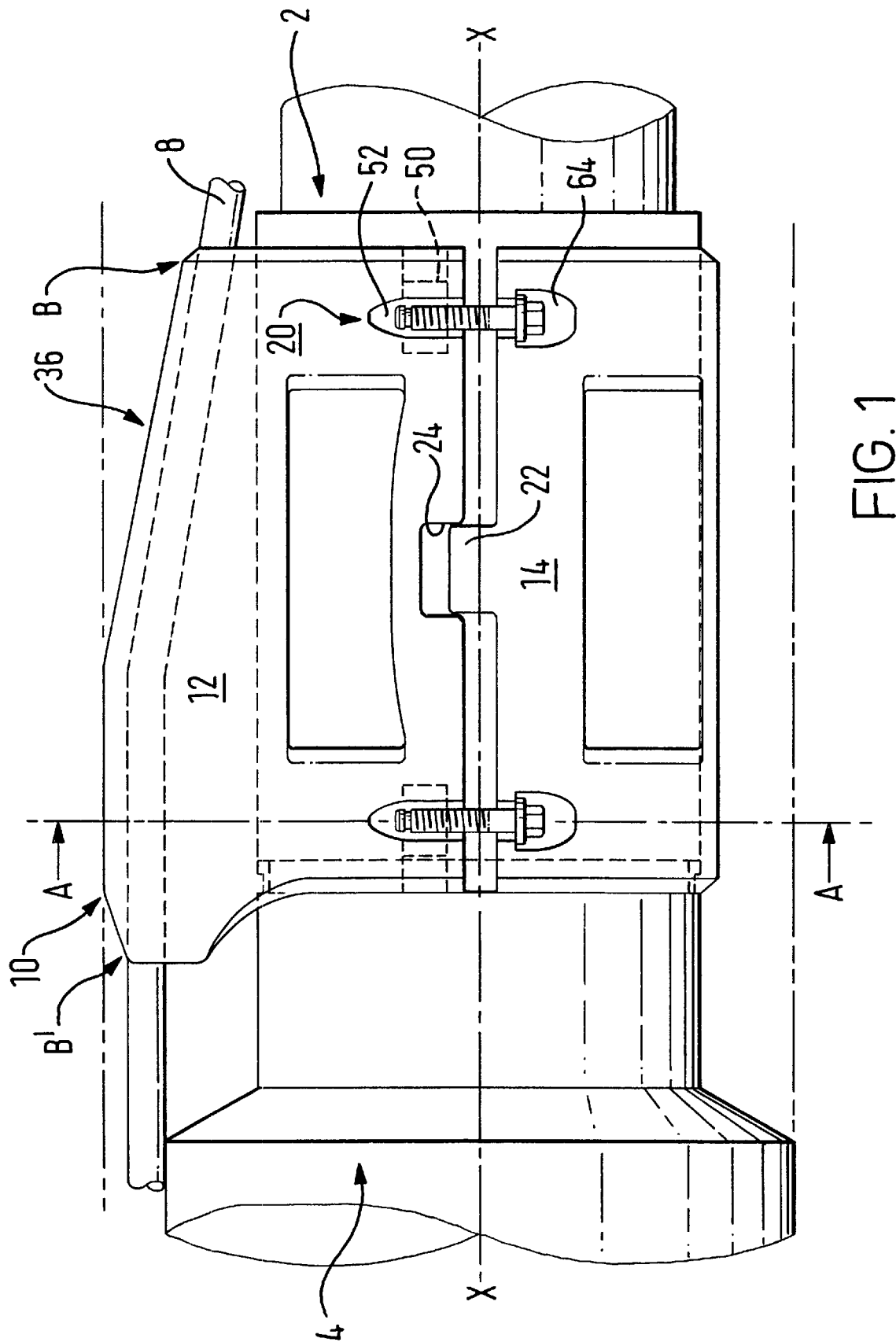
FIG. 1 shows a side view of a cable protector of an embodiment of the invention, the cable protector being in position in advance of a safety valve incorporated within a tubing string.

FIG. 1 shows a cable protector, generally referenced as 10, in situ on a tubing string 2. In the illustrated embodiment, a safety valve 4 is incorporated within the tubing string 2. As is frequently the case, the safety valve 4 has a diameter which is considerably larger than that of the general run of the tubing string 2 so that cables, as 8, which extend along the outside of the tubing string 2 have to span an area of varying diameter. Whether the diameter varies in one or more steps or over a smooth curve, this change in diameter can, in the environment of a downhole, produce stresses and strains on cables and thereby damage them. Of course, the very fact that the safety valve 4 has an increased diameter also brings cables 8 very much closer to the inner surface of the downhole and this, again, risks damage to the cables.

FIG. 1 shows an embodiment of a cable protector 10 arranged to be fastened onto a tubing string 2 at the lead in to the safety valve 4 to ensure that cables 8 are able to cope with the changes in diameter without strain or damage.

In the embodiment shown in FIG. 1, the cable protector 10 is formed from two cast bodies 12 and 14 hingedly connected together along an elongate hinge line 16 (FIG. 2). The cast bodies 12 and 14 cooperate to define a substantially circular inner cross-section which is visible in FIG. 2.

In the embodiment of the cable protector 10 shown in FIGS. 1 and 2, the two body members 12 and 14 are hinged by way of two spaced hinges 18. However, it will be appreciated that the body members 12 and 14 may be hingedly connected as required, and in particular, one or more individual hinge points may be provided along the hinge line 16.

At the other side, the two body members 12 and 14 are fastened together by fastening means indicated at 20. Again, two spaced fastening means 20 are illustrated, but one or more appropriate fastening means may be spaced along the longitudinal extent of the cable protector 10.

In the illustrated embodiment, and as shown particularly in FIG. 1, the lower body member 14 is provided with a projection 22 along the longitudinal edge thereof, which projection 22 is engageable within a recess 24 in the longitudinal edge of the upper body member 12. The interengaging protection 22 and recess 24 facilitate the interengagement of the two body members 12 and 14, and hence the fastening of the cable protector 10 on the tubing string 2. The projection 22 and recess 24 also ensure that the two body members 12 and 14 of the cable protector 10 are correctly fastened together in use.

As is apparent in FIGS. 1 and 2, the upper body member 12 is provided with an elongate cable slot 26 therein. Furthermore, the upper body member 12 is shaped to give the cable protector an increasing internal cross-sectional size, or transverse dimension, along its length from one end B to the other end B' whereby the distance of cables 8 from the longitudinal axis X—X of the tubing string 2 increases as they extend, within the cable slot 26, from the one end B to the other end B' thereof. By this means, any cable 8 received within the cable slot 26 is guided along a path which has a varying spacing from the longitudinal axis X—X. This enables the cables to extend along the outer diameter of the safety valve 4 protected by their receipt within the cable slot 26.

As is apparent in FIG. 2, the cable protector 10 is provided with cable retention means 30 to retain the cables 8 in the cable slot 26. These cable retention means 30 may comprise one or more elongate members 30 together effectively extending over the length of the cable slot 26 within the upper body member 12. Alternatively, and as illustrated in FIG. 4, one or more individual retention members 30 may be provided.

Cable retention members 30, of whatever shape and size, are preferably hingedly connected within the cable slot 26. Thus, the or each cable retention member 30 may have an extension indicated at 32 arranged to be hingedly connected by appropriate means to one side wall of the cable slot 26. Similarly, the or each cable retention member 30 may have an extended portion 34 for engagement within an appropriate recess (not shown) in the other wall of the cable slot 26 whereby the or each cable retention member 30 may be retained in position, as shown in FIG. 2, to retain cables 8 within the cable slot 26.

In use, the cable protector 10 is positioned on the tubing string 2 so that the lower body portion 14 is in the required position. The cable retention members 30 are hinged open, and one or more cables 8 can then be run along the cable slot 26. The retention members 30 are then placed in their closed position whereby the cables 8 are retained in the cable slot 26. The upper body member 12 is then hinged to its closed position and is fastened to the lower body member 14 by way of the fastening means 20. It is ensured that the projection 22 engages in the recess 24 to avoid any relative twist or rotation of the two body members 12 and 14. It will be appreciated, that once the cable protector 10 has been fastened into position, the tubing string 2 with the protector 10 located thereon, may be run into a downhole well. During such a running operation, the transition of the cables 8 from the small diameter portion adjacent the tubing string 2 to the large diameter portion adjacent the safety valve 4 is fully protected. Preferably, and as indicated, an external part 36 of the upper body member 12 is given a long and gentle chamfered surface to aid in the running in of the cable protector 10 into a downhole well.

It is possible, of course, to shape the internal surface of the cable slot 26 to house specific cables 8. Then, and as indicated in FIGS. 2 and 4, the retention members 30 simply need to close off the internal surface of the cable slot 26 to retain the cables 8 in position.

In an alternative embodiment, and as illustrated in FIG. 5, a retention member 30' is shaped to define a slot 38 for receiving cables, as 8. In this alternative embodiment, therefore, cables may be initially positioned along the or each retention member 30' and then located within the cable slot 26 by hingedly moving the retention members 30' to the closed position.

The hinge members 18 and the fastening members 20 may be configured as required. However, it is preferred that they do not protrude relative to the external diameter of the cable protector 10.

In the embodiments illustrated, each hinge member 18 preferably comprises an elongate bolt 40 extending in recesses provided in each body member 12 and 14 to hold the two body members together. Pivoting of the body members 12, 14 relative to one another is provided by an elongate, cylindrical barrel 42 extending within a bore (not shown) formed in the upper body member 12. The upper body member 12 is thus pivotable about the barrel 42. The bolt 40 extends through the barrel 42, but as the bolt is within a recess in the body member 12, the bolt does not prevent the pivoting movement. The bolt 40 carries a bolt head 44 which is engaged within the recess in the lower body member 14 and which prohibits pivoting movement of the bolt 40 in the direction indicated by the arrow E.

There are advantages to using, for the fasteners 20, a construction which is similar to that of a hinge 18. This reduces the number of different, individual parts which have to be provided. Accordingly, and as indicated, a tubular barrel 50 is received within a bore (not shown) in the upper body member 12 such that the upper body member 12 is pivotable relative to the barrel 50. This barrel 50 extends across a recess 52 in the upper body member 12 in which a bolt 56 extends. The bolt 56 carries a washer 58 which may be screwed into position to retain the two body members 12 and 14 together. In the retained position, the bolt 56 extends upwardly beyond the barrel 50 and this prevents swinging movement of the bolt 56 in the direction of arrow C as illustrated.

When fastening the two body members 12 and 14 together, the bolt 56 is captured within the barrel 50 but does not protrude upwardly with respect thereto. The barrel 50 thereby allows the bolt 56 to be swung outwardly and enables it to be positioned, together with the washer 58 in a recess 64 in the lower body member 14. The washer 58 may then be tightened to hold the bolt 56 in place and during this tightening, the bolt 56 protrudes above the barrel 50. This means that swinging of the bolt as indicated by the arrow C does not occur once the two body members 12 and 14 have been fastened together. This ensures that if the fastening means is subject to vibration or other stresses, it is unlikely to release.

In the embodiments described and illustrated, the hinge members 18 and the fasteners 20 are each formed of an elongate bolt 40, 56 captured within a barrel 42, 50. It will be appreciated that with such a construction the relative positions of the bolt and the barrel are variable whereby the internal dimensions of the cable protector are variable. This enables a cable protector of a fixed size to be selectively fitted onto one of a range of tubulars which vary in diameter without the need to machine the cable protector.

Preferably, the diameter circumscribed by the cable protector 10 is determined by adjustment of the hinge members 18.

Figure 6:
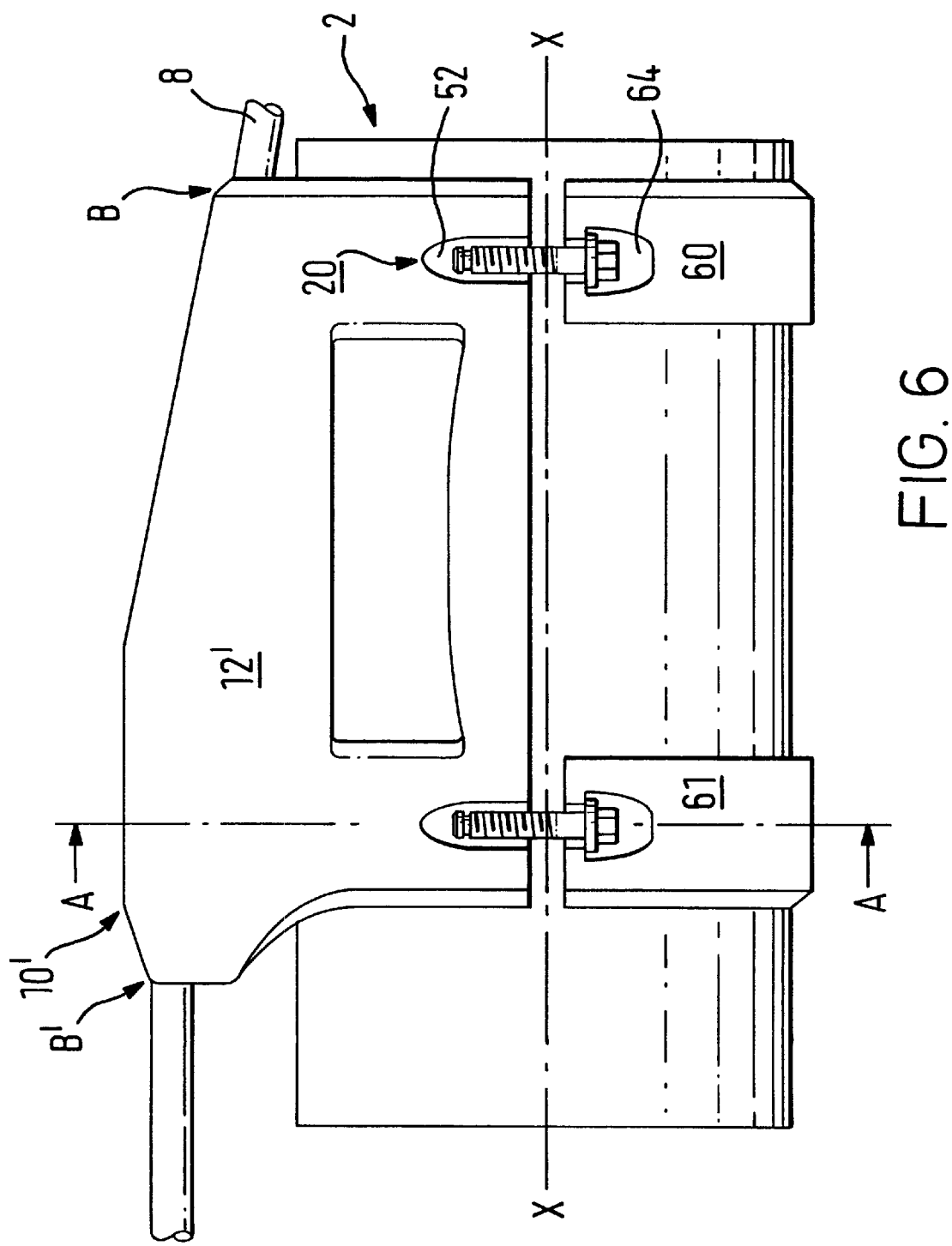
FIG. 6 shows a side view of an embodiment of the cable protector composed of three cast members.

In an alternative embodiment shown in FIG. 6, the cable protector 10' is formed from three cast members 12',60 and 61. The first body member 12' forms a base for the cable protector and is substantially semicircular in its configuration. The two remaining cast members, 60 and 61, are in the form of semi-annular collars and are individually hinged along an elongate hinge line 16 (shown in FIG. 2) to the first and second ends (B and B' respectively) of the base member 12' by way of independent hinges 18 as shown in FIG. 2.

At the other side, the two semi-annular collars, 60 and 61, are connected to the ends of the base body member 12' by fastening means 20 illustrated in FIGS. 2 and 3.

It will be appreciated that variations in and modifications to the invention as described and illustrated may be made within the scope of this application as defined by the appended claims.

What is claimed is:

1. A cable protector for tubulars, the cable protector comprising an elongate protector body having a longitudinal axis and having first and second ends, the first and second ends being spaced apart along the longitudinal axis and defining the length of the protector body, the protector body being hollow and defining, in a plane generally transverse to said longitudinal axis, a substantially circular internal cross-section that is centered on said longitudinal axis, the protector body comprising at least first and second body members hingedly connected to enable the protector body to encircle a tubular, and fastening means for fastening the body members together to hold the protector body around the tubular, each of said body members having a generally concave inner surface which extends along a circumferential part of the substantially circular internal cross-section, and the protector body further comprising a cable slot which is provided in the concave inner surface of the first body member and extends along the longitudinal extent of the protector body, and wherein one or more cable retention members are removably receivable within said cable slot to retain cables therein, said cable retention members being disposed to extend longitudinally along the length of the protector body.

2. A cable protector according to claim 1, wherein the cable slot has a bottom inner surface and wherein a distance between the bottom inner surface of the cable slot and the longitudinal axis of the protector body varies along the length of the protector body, whereby a cable or cables received within the cable slot are constrained to follow a path along the longitudinal extent of the cable protector which has a varying spacing from the longitudinal axis of the cable protector.

3. A cable protector according to claim 2, wherein the internal transverse dimension of the protector body is less at one end thereof than at the other end whereby cables retained within the cable slot span an area along a tubular with a varying diameter.

4. A cable protector according to claim 3, wherein the elongate protector body of the cable protector is formed by two cooperating body members hingedly connected along an elongate hinge line.

5. A cable protector according to claim 4, wherein two or more individual hinge pins are spaced along the hinge line to connect the two body members together.

6. A cable protector according to claim 5, wherein each of the two body members is a substantially solid metal casting.

7. A cable protector according to claim 5, wherein each of the two body members is a metal casting and has areas thereof omitted to save material and weight.

8. A cable protector according to claim 7, wherein the protector body, formed from said two body members, is configured to present two annular collars interconnected by elongate blades.

9. A cable protector according to claim 1, wherein the cable protector is formed from three cooperating body members, the first body member being a base member which is substantially semicircular in configuration, and wherein at each of the ends of the base member, two second body members in the form of semi-annular collars are hingedly connected thereto such that the cable protector has two semi-annular collars interconnected by the semicircular base body member.

10. A cable protector according to claim 9, wherein the base member is a substantially solid metal casting.

11. A cable protector according to claim 9, wherein the base member is configured to have spaced semicircular collars interconnected by elongate blades.

12. A cable protector according to claim 9, wherein each semicircular collar is hingedly connected to the base member to define an elongate hinge line.

13. A cable protector according to claim 12, wherein each semicircular collar is hinged to the base member by way of a respective hinge pin.

14. A cable protector according to claim 1, wherein the fastening means for fastening the body members together are configured such that they do not protrude relative to the external surface of the cable protector.

15. A cable protector according to claim 1, wherein said fastening means comprises one or more fastening members, each said fastening member being appropriately mounted in the material of the protector body and pivotable relative to the protector body to enable fastening thereof.

16. A cable protector according to claim 15, wherein each said fastening member is an elongate bolt pivotally mounted with respect to the protector body, and a nut is threaded onto the bolt and is arranged to engage a further part of the protector body whereby the body members are fastened together.

17. A cable protector according to claim 16, wherein the bolt of each said fastening member extends through a tubular barrel which provides the pivoting movement of the fastening member.

* * * * *